United States Patent
Choi et al.

(10) Patent No.: US 8,116,785 B2
(45) Date of Patent: Feb. 14, 2012

(54) METHOD FOR PROVIDING LOCATION-BASED SERVICE USING LOCATION TOKEN

(75) Inventors: Hae-Ock Choi, Daejon (KR); Jeong-Ah Jang, Daejon (KR); Kyong-Ho Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 812 days.

(21) Appl. No.: 12/094,525

(22) PCT Filed: Nov. 24, 2006

(86) PCT No.: PCT/KR2006/004983
§ 371 (c)(1),
(2), (4) Date: May 21, 2008

(87) PCT Pub. No.: WO2007/061255
PCT Pub. Date: May 31, 2007

(65) Prior Publication Data
US 2008/0280626 A1    Nov. 13, 2008

(30) Foreign Application Priority Data
Nov. 28, 2005   (KR) .................. 10-2005-0114395

(51) Int. Cl.
H04W 24/00 (2009.01)
H04M 3/16 (2006.01)
H04M 1/66 (2006.01)
H04M 1/68 (2006.01)
(52) U.S. Cl. ............... 455/456.1; 455/410; 455/411
(58) Field of Classification Search .......... 455/410, 455/411, 456.1
See application file for complete search history.

(56) References Cited

U.S. PATENT DOCUMENTS
2002/0004399 A1* 1/2002 McDonnell et al. ........ 455/456
2004/0198379 A1  10/2004 Magee et al.

FOREIGN PATENT DOCUMENTS
EP   1 189 462      3/2002
GB   2413744 A  * 11/2005
KR   10-2001-0032515   4/2001
(Continued)

OTHER PUBLICATIONS

International Search Report for PCT/KR2006/004983 dated Feb. 7, 2007.
Jae-Gwi Choi et al., "New Anonymous Fingerprinting Scheme Based on the Proxy Signature and Committed Oblivious Transfer", Telecommunications Review, pp. 711-719, Oct. 2002 with English abstract.

(Continued)

*Primary Examiner* — Marisol Figueroa
(74) *Attorney, Agent, or Firm* — Kile Park Goekjian Reed & McManus PLLC

(57) ABSTRACT

Provided is a method for providing a location-based service using a location token. The method includes the steps of: a) receiving an encrypted token message including constraints for location information access from a terminal; b) decoding and storing the transmitted token message in a token database; c) creating a location token accessible to the transmitted token message and transmitting the location token to the terminal; d) extracting a token message number in the location token transmitted from a location-based service server, checking constraints of a user and updating an exception list; and e) acquiring location information of the terminal and transmitting the location information to the location-based service server.

3 Claims, 2 Drawing Sheets

FOREIGN PATENT DOCUMENTS

| | | |
|---|---|---|
| KR | 10-2001-0057169 | 7/2001 |
| KR | 10-2005-0014940 | 2/2005 |
| KR | 10-2005-0018926 | 2/2005 |
| KR | 10-2005-0053967 | 6/2005 |
| KR | 10-2005-0071768 | 7/2005 |
| KR | 10-2005-0096746 | 10/2005 |
| WO | WO 03065754 A1 * | 8/2003 |

OTHER PUBLICATIONS

Chanjoo Chung et al., "Wireless PKI-based Certificate and Key Roaming Service without the Use of WIM, USIM Smartcard", Telecommunications Review, pp. 495-504, Jun. 2003 with English Abstract.

* cited by examiner

METHOD FOR PROVIDING LOCATION-BASED SERVICE USING LOCATION TOKEN

TECHNICAL FIELD

This invention is a matter of method for providing location-based service using a location token; more particularly, to a location-based service providing method using a location token which creates an electronically signed location token accessible to user location information in constraints of the number of times or temporal and spatial restrictions when location information of a user terminal is requested, and transmits the location token to the terminal. A location server receives the location token from a location-based service server upon request of the location information in a location server, extracts a token message number to check constraints information of the user and transmits the user location information to the location-based service server.

BACKGROUND ART

A location-based service (LBS) is a wireless communication service providing value-added information based on the location of a mobile terminal.

In FIG. 1, a conventional location-based service system includes a user terminal 10, a location-based service server 20 and a location server 30.

The user terminal 10 requests/provides a location-based service to/from the location-based service server 20.

The location-based service server 20 provides the location-based service to the user terminal 10 based on the user location information acquired by being linked to the location server 30 upon location-based service request of the user terminal 10.

The location server 30 acquires the location information of the user terminal 10 upon location information request of the location-based service server 20 and provides the location information to the location-based service server 20.

The conventional location-based service providing method is as follows.

When an agreement between the terminal 10 and the location server 30, and an agreement between the location-based service server 20 and the location server 30 are concluded through a preliminary procedure, the user requests a location-based service at step S101 using the user terminal 10 accesses to the required location-based service server 20. The terminal 10 transmits a codeword pre-registered in the location server 30 to protect the user location information with the location-based service request.

The location-based service server 20 requests the required user location information to the location server 30 with the transmitted codeword at step S102.

The location server 30 checks whether the user location information is registered in a user location information exception list. When the user location information is not registered in the user location information exception list, the location server 30 transmits a message to a terminal user, checks whether the user location information is registered in the list, and registers the user location information.

The location-based service requested by the user is set up such that the location information should be provided through a specific checking procedure. That is, the location server 30 requests the terminal 10 to authentication of location information and receives a corresponding response at steps S103 and S104.

The location server 30 makes the location information of the terminal 10 based on a location measuring technology such as cell-ID or Global Positioning System (GPS) methods at step S105 and provides it to the location-based service server 20 at step S105 and S106.

The location-based service server 20 provides the location-based service such as contents or delivery service to the terminal 10 based on the provided location information at step S107.

In the conventional location-based service providing method, when the location server 30 and the location-based service server 20 are operated by the same company or mobile carrier, the location information can be provided based on mutual trust. However, when the location-based service is provided by another location service provider and the location information is provided by the mobile carrier, a location operator which providing location information typically the mobile carrier should take a complicated preliminary procedure related to provision of location information with the location service provider for privacy protection.

Accordingly, the conventional location-based service providing method has problems as follows.

First, by using the fixed format of plain text password as a codeword, a password provided to the location-based service server 20 is exposed to a third party through a malicious service provider or a network hacking, the password may easily leak out.

Second, since a pre-registering procedure for acquiring reliability with the location operator is performed through a complicated procedure such as offline contract in a position of the location service provider, it is difficult for the location service provider to promptly provide a service.

Third, since it is required to go through personal setup change access for an individual location server to set up constraints for one or a specific frequency, or a time and a space in use of the location-based service, there is a problem of inconvenient to use the location-based service.

DISCLOSURE

Technical Problem

It is, therefore, an objective of the present invention to provide a location-based service (LBS) providing method which protects personal location information of a location-based service user, provides safe location-based commerce and an information service, secures reliability among the user, a location service provider and a location operator, conveniently controls access to the user location information through setup of a token by creating the an electronically signed location token accessible to user location information in constraints as much as the specific number of times or in a temporarily, or spatially limited range when location information of a user terminal is requested, transmitting the location token to the terminal, receiving the location token from a location-based service server upon request of the location information in a location server, extracting a token message number, checking constraints of the user and transmitting the user location information to the location-based service server.

Other objectives and advantages of the invention will be understood by the following description and become more apparent from the embodiments in accordance with the present invention, which are set forth hereinafter. It will be also apparent that objectives and advantages of the invention can be embodied easily by the means defined in claims and combinations thereof.

Technical Solution

In accordance with an aspect of the present invention, there is provided a location-based service providing method using a location token at a location server, the method including the steps of: a) receiving an encrypted token message including constraints for location information access from a terminal; b) decoding and storing the transmitted token message in a token database; c) creating a location token accessible to the transmitted token message and transmitting the location token to the terminal; d) extracting a token message number in the location token transmitted from a location-based service server, checking constraints of a user and updating an exception list; and e) acquiring location information of the terminal and transmitting the location information to the location-based service server.

In accordance with another aspect of the present invention, there is provided a location-based service providing method using a location token at the terminal, the method including the steps of: a) requesting a location-based service to a location-based service server; b) setting up constraints for location information access, encrypting a token message including the constraints and transmitting the token message to the location server; c) receiving a location token accessible to the token message from the location server and transmitting the location token to the location-based service server; and d) receiving a location-based service requested from the location-based service server.

In accordance with another aspect of the present invention, there is provided a location-based service providing method using a location token at the location service server, the method including the steps of: a) requesting a location-based service in a terminal; b) transmitting a location token transmitted from the terminal to a location server with a location information request message; c) receiving location information of the terminal from the location server; and d) providing a location-based service to the terminal based on the location information provided from the location server.

Advantageous Effects

The present invention protects personal location information of a location-based service user, provides safe location-based commerce and an information service, acquires thrust among the user, a location service provider and a location operator, conveniently control access to the user location information through setup of a token by creating the an electronically signed location token accessible to user location information in a range limited as much as the specific number of times or in a temporarily and spatially limited range when location information of a user terminal is requested, transmitting the location token to the terminal, receiving the location token from a location-based service server upon request of the location information in a location server, extracting a token message number, checking constraints of the user and transmitting the user location information to the location-based service server.

Since the present invention has the location token used in the location-based service, the user can safely use the location token for requesting a taxi and delivering materials without leakage.

The present invention can avoid risk of the password which has been generally used. Also, the present invention breaks a conventional method for transmitting through only communications such as a certificate, and can use diverse methods for accessing to the location information.

DESCRIPTION OF DRAWINGS

The above and other objectives and features of the present invention will become apparent from the following description of the preferred embodiments given in conjunction with the accompanying drawings, in which.

BEST MODE FOR THE INVENTION

Other objectives and advantages of the present invention will become apparent from the following description of the embodiments with reference to the accompanying drawings. Therefore, those skilled in the art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
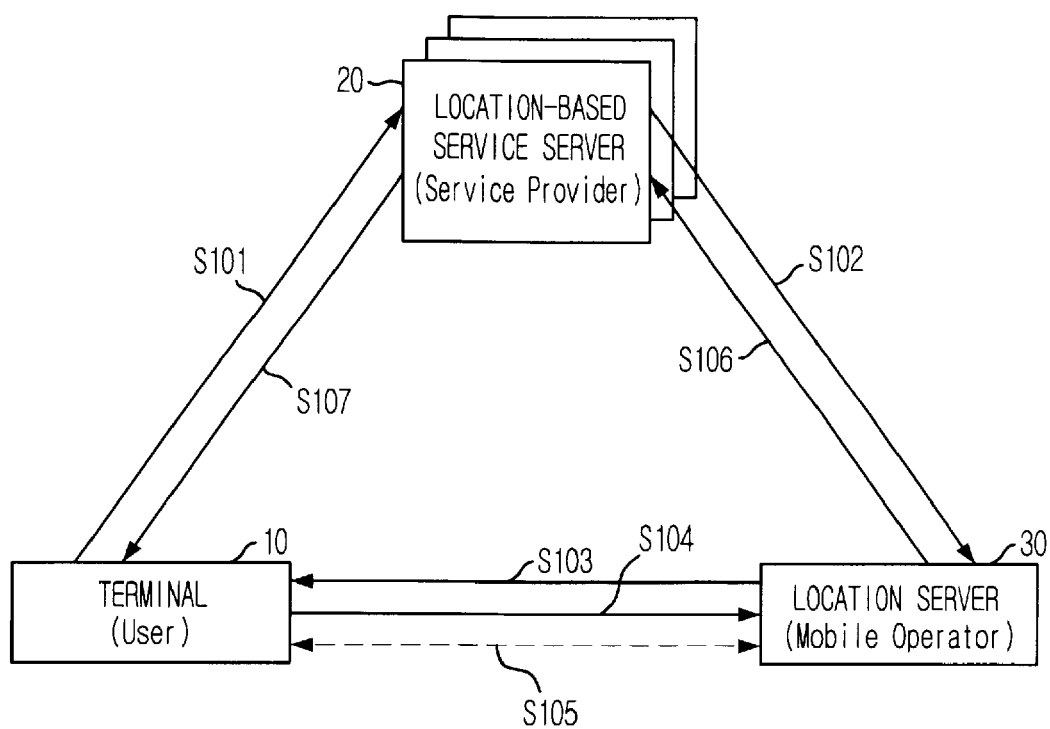
FIG. 1 shows a conventional location-based service (LBS) providing method.
Figure 2:
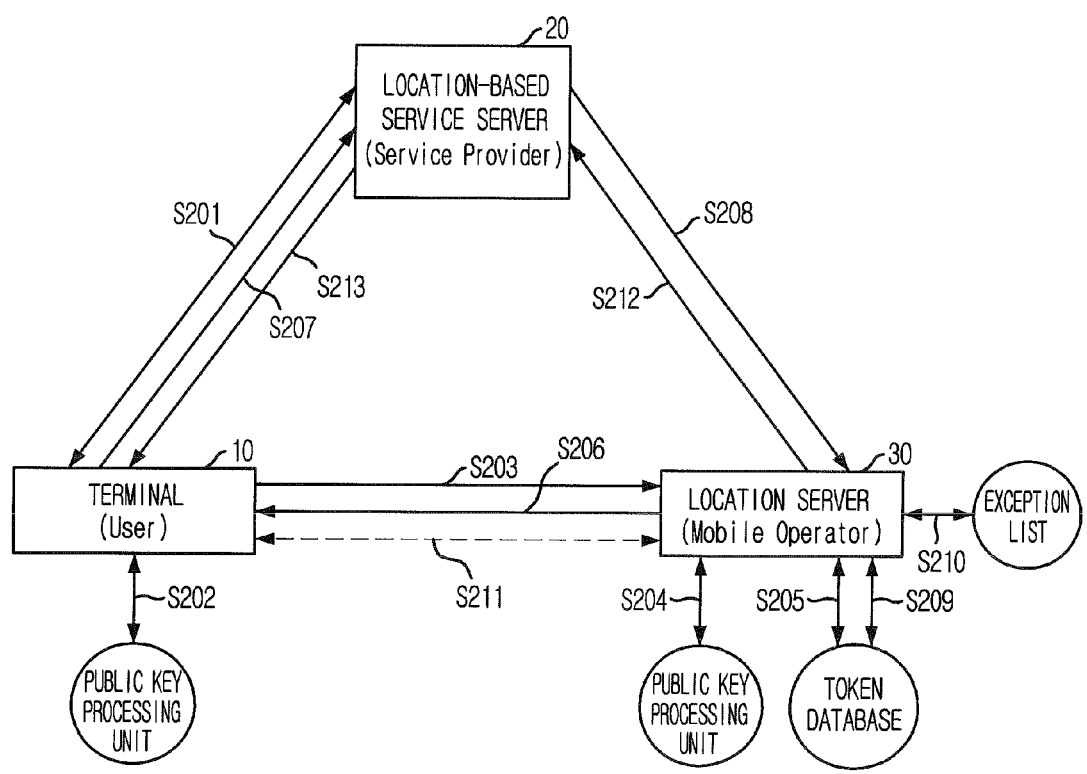
FIG. 2 shows a location-based service providing method using a location token in accordance with an embodiment of the present invention.

FIG. 2 shows a location-based service (LBS) providing method using a location token in accordance with an embodiment of the present invention.

A user requests a location-based service to a location-based service server 20 through a terminal 10 at step S201. Constraints for location information access, i.e., frequency, time, space and an access location server, are set up.

A token message including the constraints is encrypted through a public key processing unit and transmitted to a location server 30 at steps S202 and S203.

The location server 30 decodes and stores the token message in a token database at steps S204 and S205. Also, the location server 30 can identifies the transmitted terminal 10 by checking a source of the token message.

The location server 30 creates a location token accessible to the token message and transmits the location token to the terminal 10 at step S206.

The terminal 10 transmits the location token transmitted from the location server 30 to the location-based service server 20 at step S207.

The location-based service server 20 transmits the location token transmitted from the terminal 10 to the location server 30 with a location information request message at step S208.

The location server 30 extracts a token message number in the location token transmitted from the location-based service server 20, checks the user constraints based on the token message number and updates an exception list at steps S209 and S210.

The location server 30 acquires and transmits location information of the terminal 10 to the location-based service server 20 at step S211 and S212. The method for acquiring location information includes generally well-known cell-ID or Global Positioning System (GPS) methods.

The location-based service server 20 provides a location-based services to the terminal 10 based on the location information provided from the location server 30 at step S213.

More specifically, a location information token message is formed by determining proper location information constraints of a required service by the user at the step S201. The location information token message includes "validTime" designating a maximum effective time of the location information token, "numOfAcc" designating access frequency limit, "restrictTime" designating time limit of allowing location information access, "restrictArea" designating spatial limiting location information access, "checkType" for setting up whether to request to check location information provision to the user in location information access, and "lbsp" for limiting a location provider accessible to the location information.

It can be simply described as follows:
LTokenMessage=<validTime, numOfAcc, restrictTime, restrictArea, checkType, lbsp>

LTokenMessage, which is the location information token message, will be described in detail as follows.
- "validTime" is formed of only validStopTime, i.e., a final time that in which a location token can be used when necessary. It is also possible to form the "validTime" in forms of <validStartTime, validStopTime> by adding validStartTime such that a token can be effective from a future specific time.
- When "numOfAcc" is "0", "numOfAcc" can have a meaning that there is no frequency limit.
- "restricTime" is generally used as a form of <startTime, stopTime> and can have a meaning of a start time and an end time allowing location information provision during a day. "restricTime" can be also formed of <baseTime, duration> and mean a periodic time.
- "restricArea" means spatial constraints and can be a Box type, a Circle type, "Polygon" type and "Multipolygon" type.
- "checkType" means a method for checking access to the user in location information access and 5-step type of 3rd Generation Partnership Project (3GPP) can be used as basic.
- "lbsp" is used to restrict a location-based service server or location service provider accessing to the location information, and the location information is allowed only to an identifiers of the service provider arranged in lbsp.

The token message is encrypted based on the public key processing unit of the terminal 10 at the steps S202 and S203 and transmitted to the location operator.

Terms will be defined as follows for the sake of convenience in explanation.
  USER: user
  LCS: location server or location operator
  LBSP: location-based service or location service provider
  SKX: secret key of X
  PKX: public key of X
  E(X,Y): procedure for encrypting data Y based on encrypting key X
  D(X,Y): procedure for decoding the encrypted Y based on the decoding key X
  MD X: message digest of X
  Verify(X, Y): procedure for verifying data Y based on public key X
  Send(X,Y): procedure for transmitting data Y to system X and receiving the result
  OTP(X, Y): procedure for receiving "one-time password" accessible to actual data through data Y by setting up data X as a key
  DOTP(X, Y): procedure for returning original "LTokenMessageRef" based on the password Y created by setting up data X as a key
  Numbering(X): procedure for transforming data X into a number form which can be easily read by people
  DNumbering(X): procedure for re-transforming data X into a form which can be used in "OTP"

At the steps S202 and S203, "LTokenMessage" is encrypted as a secret key T1 of the user as follows and transmitted to the location server 30.
  T1=E(SKUSER, LTokenMessage)

At the steps S204 and S206, the location server 30 receiving T1 searches a public key of the user stored in the token database of the user, verifies T1 based on the public key and creates T2 having a following form.
  T2=Verify(PKUSER, T1)
  LTokenMessage=D(PKUSER, T1)

When T2 is valid data, T1 is decoded into "LTokenMessage" and the message is stored in the token database of the user. Subsequently, "LTokenMessageRef" accessible to "LTokenMessage" of the user returns. When the password is inputted based on "LTokenMessageRef" and the identifier of the user, T3 is created having a following form which is an one-time password returning "LTokenMessageRef".
  T3=OTP(USER, LTokenMessageRef)

The password is transformed into a form which can be generally read by people. Subsequently, "LToken" is created and encrypted based on a public key of the user. Accordingly, T4 is created and transmitted to the user.
  LToken=Numbering(T3)
  T4=E(PKUSER, LToken)

At the step S207, T4 is decoded as own secret key and original location token "LToken" is created.
  LToken=D(SKUSER, T4)

"LToken", which is a location token, is a readable text. "LToken" is transmitted to the location operator in a safe form such as a telephone or fax. Or encrypted into a secret key of the user, and a following T5 is created and is provided to the location service provider.
  T5=E(SKUSER, LToken)

In the step S208, when the location-based service server 20 receives "LToken" from the terminal 10, the location-based service server 20 directly requests location information to the location server 30 with a location information request message without decoding. When the location-based service server 20 receives T5 through communications, the location-based service server 20 decodes T5, creates "LToken", creates T6 with "LocationRequest" which is a location information request message, and requests location information to the location server 30. When the safety of the communication network is not guaranteed, T5 is encrypted and transmitted as a secret key of the location operator after creation of following T7.
  LToken=D(PKUSER, T5)
  T6=<LocationRequest, LToken>
  T7=E(SKLCSP, T6)

In the step S209 and S210, the location server 30 receives T6 or T7 from the location-based service server 20. When T7 is transmitted, the location server 30 decodes T7 and creates T6. Also, the location server 30 performs "DNumbering" on "LToken" and transforms "LToken" into actual password T3. Accordingly, "LTokenMessageRef" referring "LTokenMessage" is returned.
  T6=D(PKLCSP, T7)
  T3=DNumbering(LToken)
  LTokenMessageRef=DOTP(USER, T3)

The location server 30 searches "LTokenMessage" from the token database based on "LTokenMesssageRef", compares "LTokenMessage" with "LocationRequestUSER" which is a request of the location service provider, and determines whether to provide location information. When it is determined to provide the location information, the user location information is provided to the location service provider and a user exception list is updated such that the location service provider can use the location information in the range allowed by the user.

In the steps S211 and S212, the location server 30 confirms whether the location information is provided according to checkType which is exception list setup of the user, measures the location and transmits the location information to the location-based service server 20.

In the step S213, the location-based service server 20 provides the location-based service to a user 10 based on the location information provided from the location server 30.

In the steps S204 and S206, if T3 created by OTP is created in a text format which is easily understandable and memorable by general users, a transforming procedure based on "Numbering" and a "DNumbering" procedure can be omitted.

As described in detail, the technology of the present invention can be realized as a program and stored in a computer-readable recording medium, such as CD-ROM, RAM, ROM, a floppy disk, a hard disk and a magneto-optical disk. Since the process can be easily implemented by those skilled in the art of the present invention, further description will not be provided herein.

The present application contains subject matter related to Korean patent application No. 2005-0114395, filed with the Korean Intellectual Property Office on Nov. 28, 2005, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A location-based service providing method using a location token at a location server, comprising the steps of:
   a) receiving an encrypted token message including constraints for location information access from a terminal;
   b) decoding and storing the transmitted token message in a token database;
   c) creating a location token accessible to the transmitted token message and transmitting the location token to the terminal;
   d) extracting a token message number in the location token transmitted from a location-based service server, checking constraints of a user and updating an exception list; and
   e) acquiring location information of the terminal and transmitting the location information to the location-based service server.

2. The method as recited in claim 1, wherein the token message includes "validTime" designating a maximum effective time of the location information token, "numOfAcc" designating access frequency limit, "restrictTime" designating time limit in allowance of location information access, "restrictArea" limiting the location information access, "checkType" for setting up whether to request to check location information provision to the user in location information access, and "lbsp" for limiting a provider accessible to the location information.

3. The method as recited in claim 1, wherein the constraints include frequency, a time, a space and a location server accessible to the location information.

* * * * *